(12) United States Patent
Yuasa et al.

(10) Patent No.: US 8,962,760 B2
(45) Date of Patent: Feb. 24, 2015

(54) RUBBER COMPOSITION, PRODUCTION METHOD THEREFOR AND TIRE

(75) Inventors: Takeshi Yuasa, Tokyo (JP); Koji Okada, Tokyo (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 14/000,072

(22) PCT Filed: Feb. 15, 2012

(86) PCT No.: PCT/JP2012/053507
§ 371 (c)(1),
(2), (4) Date: Aug. 16, 2013

(87) PCT Pub. No.: WO2012/111697
PCT Pub. Date: Aug. 23, 2012

(65) Prior Publication Data
US 2013/0324667 A1 Dec. 5, 2013

(30) Foreign Application Priority Data
Feb. 17, 2011 (JP) ................. 2011-032112

(51) Int. Cl.
*C08F 8/00* (2006.01)
*C08L 15/00* (2006.01)
*C08L 9/06* (2006.01)
*B60C 1/00* (2006.01)
*C08C 19/44* (2006.01)

(52) U.S. Cl.
CPC .............. *C08L 9/06* (2013.01); *B60C 1/0016* (2013.04); *C08C 19/44* (2013.01); *C08L 15/00* (2013.01); *C08L 2205/02* (2013.01)
USPC ......................................... 525/192; 525/232

(58) Field of Classification Search
CPC ........ C08L 15/00; C08L 3/36; C08L 2205/02
USPC .............................................. 525/192, 232
See application file for complete search history.

(56) References Cited

U.S. PATENT DOCUMENTS

| 5,708,053 | A | 1/1998 | Jalics et al. |
| 2005/0239946 | A1 | 10/2005 | Lin et al. |
| 2008/0103261 | A1* | 5/2008 | Tanaka et al. ............ 525/331.9 |
| 2011/0112212 | A1* | 5/2011 | Kimura et al. ............ 523/156 |

FOREIGN PATENT DOCUMENTS

| EP | 2130841 | 12/2009 |
| JP | 2004-182894 | 7/2004 |
| JP | 2005-350603 | 12/2005 |
| JP | 2006-063209 | 3/2006 |
| JP | 2009-179754 | 8/2009 |
| JP | 2010-254791 | 11/2010 |
| WO | WO2006/076670 A2 | 7/2006 |
| WO | WO2006/076670 A3 | 7/2006 |

OTHER PUBLICATIONS

U.S. Appl. No. 14/007,156, filed Sep. 24, 2013, Okada, et al.
International Search Report Issued Mar. 13, 2012 in PCT/JP12/053507 Filed Feb. 15, 2012.
U.S. Appl. No. 13/985,471, filed Aug. 14, 2013, Okada, et al.
Extended European Search Report issued Dec. 19, 2014 in corresponding European Patent Application No. 12747067, filed Feb. 15, 2012.

* cited by examiner

*Primary Examiner* — Nathan M Nutter
(74) *Attorney, Agent, or Firm* — Oblon, Spivak, McClelland, Maier & Neustadt, L.L.P.

(57) ABSTRACT

Objects of the present invention are to provide a rubber composition that can obtain a rubber elastic body having small rolling resistance and excellent impact resilience and a method for producing the same, and to provide a tire having small rolling resistance and excellent impact resilience. The rubber composition of the present invention is obtained by kneading a conjugated diene polymer (A) having a group with bonding reactivity to silica only at one site of one molecule of the polymer, a polymer (B) having groups with bonding reactivity to silica at a plurality of sites of one molecule of the polymer, and a filler (C) containing silica.

20 Claims, No Drawings

RUBBER COMPOSITION, PRODUCTION METHOD THEREFOR AND TIRE

CROSS REFERENCE TO RELATED APPLICATIONS

The present application is a 35 U.S.C. §371 national stage patent application of International patent application PCT/JP2012/053507, filed on Feb. 15, 2012, published as WO/2012/111697 on Aug. 23, 2012, the text of which is incorporated by reference, and claims the benefit of the filing date of Japanese application no. 2011-032112, filed on Feb. 17, 2011, the text of which is also incorporated by reference.

TECHNICAL FIELD

The present invention relates to a rubber composition, a method for producing the same, and a tire, and more particularly, for example, to a rubber composition suitable for tire tread use, a method for producing the same, and a tire obtained from the rubber composition.

BACKGROUND ART

As a rubber composition used for tire treads of automobiles, there has conventionally been known one in which carbon black is blended as a reinforcing agent together with a rubber component composed of a conjugated diene rubber.

Further, with a recent increasing demand for a reduction in fuel consumption of automobiles, in order to comply with such a demand, for the purpose of a reduction in rolling resistance of tires, silica has been used as a filler.

Then, in the rubber composition in which silica is blended as the filler, the silica particles are liable to coagulate with each other and less likely to be uniformly dispersed. Accordingly, in order to solve such a problem, various proposals have been made (for example, see Patent Document 1 and Patent Document 2).

Patent Document 1: JP-A-2005-350603
Patent Document 2: JP-A-2006-063209
Patent Document 3: JP-A-2010-254791

SUMMARY OF THE INVENTION

Problems to be Solved by the Invention

Then, the inventors of the present invention have made intensive studies of rubber compositions in which silica is blended as a filler. As a result, it has become clear that when dispersibility of silica in the rubber compositions is excessively increased, there is a problem of failing to obtain sufficient impact resilience in rubber elastic bodies obtained from the rubber compositions.

The present invention has been made on the basis of the circumstances as described above, and an object thereof is to provide a rubber composition that can obtain a rubber elastic body having small rolling resistance and excellent impact resilience and a method for producing the same.

Further, another object of the present invention is to provide a tire having small rolling resistance and excellent impact resilience.

Means for Solving the Problems

A method for producing a rubber composition of the present invention comprises kneading a conjugated diene polymer (A) having a group with bonding reactivity to silica only at one site of one molecule of the polymer, a polymer (B) having groups with bonding reactivity to silica at a plurality of sites of one molecule of the polymer and a filler (C) containing silica.

In the method for producing a rubber composition of the present invention, it is preferable that the conjugated diene polymer (A) and the filler (C) are kneaded, followed by kneading the resulting kneaded material and the polymer (B).

In the method for producing a rubber composition, it is preferable that the mass ratio (conjugated diene polymer (A)/polymer (B)) of the conjugated diene polymer (A) and the polymer (B) is from 97/3 to 60/40.

In the method for producing a rubber composition of the present invention, it is preferable that the polymer (B) contains a structural unit derived from a conjugated diene compound.

In the method for producing a rubber composition of the present invention, it is preferable that the group with bonding reactivity to silica at one site of one molecule of the conjugated diene polymer (A) is at least one functional group selected from the group consisting of a hydrocarbyloxysilyl group, a primary amino group, a secondary amino group, a tertiary amino group, a thiol group, an epoxy group, a thioepoxy group, an oxetane group and a hydrocarbylthio group, and groups with bonding reactivity to silica at a plurality of sites of one molecule of the polymer (B) are each independently at least one functional group selected from the group consisting of a hydrocarbyloxysilyl group, a primary amino group, a secondary amino group, a tertiary amino group, a thiol group, an epoxy group, a thioepoxy group, an oxetane group and a hydrocarbylthio group.

In the method for producing a rubber composition of the present invention, it is preferable that the ratio of silica constituting the filler (C) is from 10 to 120 parts by mass based on 100 parts by mass of a rubber component containing the conjugated diene polymer (A) and the polymer (B).

A rubber composition of the present invention is obtained by kneading a conjugated diene polymer (A) having a group with bonding reactivity to silica only at one site of one molecule of the polymer, a polymer (B) having groups with bonding reactivity to silica at a plurality of sites of one molecule of the polymer, and a filler (C) containing silica.

It is preferable that the rubber composition of the present invention is obtained by kneading the conjugated diene polymer (A) and the filler (C), followed by kneading the resulting kneaded material and the polymer (B).

In the rubber composition of the present invention, it is preferable that the mass ratio (conjugated diene polymer (A)/polymer (B)) of the conjugated diene polymer (A) and the polymer (B) is from 97/3 to 60/40.

In the rubber composition of the present invention, it is preferable that the polymer (B) contains a structural unit derived from a conjugated diene compound.

In the rubber composition of the present invention, it is preferable that the group with bonding reactivity to silica at one site of one molecule of the conjugated diene polymer (A) is at least one functional group selected from the group consisting of a hydrocarbyloxysilyl group, a primary amino group, a secondary amino group, a tertiary amino group, a thiol group, an epoxy group, a thioepoxy group, an oxetane group and a hydrocarbylthio group, and groups with bonding reactivity to silica at a plurality of sites of one molecule of the polymer (B) are each independently at least one functional group selected from the group consisting of a hydrocarbyloxysilyl group, a primary amino group, a secondary amino group, a tertiary amino group, a thiol group, an epoxy group, a thioepoxy group, an oxetane group and a hydrocarbylthio group.

In the rubber composition of the present invention, it is preferable that the ratio of silica constituting the filler (C) is from 10 to 120 parts by mass based on 100 parts by mass of a rubber component containing the conjugated diene polymer (A) and the polymer (B).

A rubber composition of the present invention comprises a rubber component containing a conjugated diene polymer (A) having a group with bonding reactivity to silica only at one site of one molecule of the polymer and a polymer (B) having groups with bonding reactivity to silica at a plurality of sites of one molecule of the polymer, and at least a filler (C) containing silica added thereto.

A tire of the present invention has a tread obtained from the rubber composition.

Effect of the Invention

In a rubber composition of the present invention, a conjugated diene polymer (A) having a group with bonding reactivity to silica only at one site of one molecule of the polymer and a polymer (B) having groups with bonding reactivity to silica at a plurality of sites of one molecule of the polymer are contained together with silica constituting a filler (C). From the relationship between both these conjugated diene polymer (A) and polymer (B), the conjugated diene polymer (A) acts so as to increase dispersibility of the silica, and on the other hand, the polymer (B) acts so as to suppress dispersibility of the silica from being excessively increased. Accordingly, dispersibility of the silica can be controlled by the mixing ratio thereof, so that from the viewpoint of a balance between rolling resistance and impact resilience in a rubber elastic body obtained from the rubber composition, dispersibility of the silica can be improved.

According to the rubber composition according to the present invention, therefore, the rubber elastic body having small rolling resistance and excellent impact resilience can be obtained.

According to a method for producing a rubber composition of the present invention, a rubber composition containing a conjugated diene polymer (A) having a group with bonding reactivity to silica only at one site of one molecule of the polymer and a polymer (B) having groups with bonding reactivity to silica at a plurality of sites of one molecule of the polymer is kneaded with silica constituting a filler (C), so that from the relationship between both these conjugated diene polymer (A) and polymer (B), the conjugated diene polymer (A) acts so as to increase dispersibility of the silica, and on the other hand, the polymer (B) acts so as to suppress dispersibility of the silica from being excessively increased. Accordingly, dispersibility of the silica can be controlled by the mixing ratio thereof.

Further, in the method for producing a rubber composition of the present invention, dispersibility of the silica from the viewpoint of a balance between rolling resistance and impact resilience in the rubber elastic body obtained from the rubber composition can be more improved by kneading the conjugated diene polymer (A) and the filler (C), and thereafter, kneading the resulting kneaded material and the polymer (B). Accordingly, the resulting rubber elastic body becomes to have smaller rolling resistance and more excellent impact resilience.

A tire of the present invention has small rolling resistance, and excellent impact resilience is obtained, since a tread is composed of the rubber composition of the present invention.

MODE FOR CARRYING OUT THE INVENTION

Modes for carrying out the present invention will be described below.

A rubber composition of the present invention is characterized in that at least a filler (C) containing silica is added to a rubber component containing a conjugated diene polymer (A) having a group with bonding reactivity to silica only at one site of one molecule of the polymer and a polymer (B) having groups with bonding reactivity to silica at a plurality of sites of one molecule of the polymer.

The term "with bonding reactivity to silica" as used herein means to have an action of forming chemical bonding (including covalent bonding, hydrogen bonding and an interaction by molecular polarity) with silica.

Further, typical examples of "one site of one molecule of the polymer" include one of ends of one molecule of the polymer, namely one end of a polymer molecule.

The rubber composition of the present invention is obtained by kneading the conjugated diene polymer (A), the polymer (B) and the filler (C), and specifically, is a composition (unvulcanized rubber composition) obtained by kneading the respective elements composing the rubber composition, which forms a rubber elastic body, for example, by performing a crosslinking treatment such as vulcanization.

In the rubber composition of the present invention, the conjugated diene polymer (A) and the polymer (B) constitute the rubber component. However, in this rubber component, an optional ingredient may be contained, in addition to the conjugated diene polymer (A) and the polymer (B) as essential ingredients.

In the rubber composition of the present invention, the mass ratio (conjugated diene polymer (A)/polymer (B)) of the conjugated diene polymer (A) and the polymer (B) that constitute the rubber component is preferably from 97/3 to 60/40, more preferably from 96/4 to 65/35, and particularly preferably from 95/5 to 70/30.

In the mass ratio (conjugated diene polymer (A)/polymer (B)), when the conjugated diene polymer (A) is excessively large, namely, when the polymer (B) is excessively small, there is a possibility that the rubber elastic body obtained from the rubber composition is decreased in impact resilience. On the other hand, when the conjugated diene polymer (A) is excessively small, namely, when the polymer (B) is excessively large, there is a possibility that the rubber elastic body obtained from the rubber composition is increased in rolling resistance.

(Conjugated Diene Polymer (A))

The conjugated diene polymer (A) constitutes the rubber component, together with the polymer (B), and comprises a conjugated diene polymer as a base polymer into which the specific functional group is introduced only at one site of one polymer molecule of this base polymer, preferably at one site of one molecular end.

This conjugated diene polymer (A) may be either one in which one specific functional group is introduced into one site of one molecule of the polymer, or one in which two or more specific functional groups are introduced thereinto.

Here, the conjugated diene polymer in which two or more specific functional groups are introduced into one site of one molecule of the polymer includes one having a constitution in which two or more specific functional groups are each independently present (specifically, for example, one having a constitution in which one specific functional group is present as a substituent group of another specific functional group, or one having a constitution in which one specific functional group is present next to another specific functional group across a group which has 5 or less carbon atoms and is derived from a hydrocarbon compound).

The specific functional group in the conjugated diene polymer (A) is preferably at least one functional group selected from the group consisting of a hydrocarbyloxysilyl group, a primary amino group, a secondary amino group, a tertiary amino group, a thiol group, an epoxy group, a thioepoxy group, an oxetane group and a hydrocarbylthio group.

As the conjugated diene polymer (A), one in which at least one functional group selected from the group consisting of a hydrocarbyloxysilyl group, a primary amino group, a secondary amino group, a tertiary amino group, a thiol group, an epoxy group, a thioepoxy group, an oxetane group and a hydrocarbylthio group is introduced in combination as the specific functional group is preferable.

The conjugated diene polymer (hereinafter also referred to as a "base polymer") acting as the base polymer of the conjugated diene polymer (A) has a structural unit derived from a conjugated diene compound, and may contain a structural unit derived from an aromatic vinyl compound, together with the structural unit derived from a conjugated diene compound.

Here, when the base polymer contains the structural unit derived from the aromatic vinyl compound, the contained ratio of the structural units derived from the aromatic vinyl compound is preferably from 10 to 40% by mass.

When the contained ratio of the structural units derived from the aromatic vinyl compound is excessively small, there is a possibility that the rubber elastic body obtained from the rubber composition is decreased in dry grip performance and wear resistance. On the other hand, when the contained ratio of the structural units derived from the aromatic vinyl compound is excessively large, there is a possibility that the rubber elastic body obtained from the rubber composition is increased in rolling resistance.

As the conjugated diene compound for obtaining the structural unit derived from a conjugated diene compound in the base polymer, a straight-chain or branched compound having an aliphatic conjugated double bond is used. When the base polymer contains the structural unit derived from the aromatic vinyl compound, a compound copolymerizable with the aromatic vinyl compound is used.

Specifically, for example, 1,3-butadiene, isoprene, 2,3-dimethyl-1,3-butadiene, 1,3-pentadiene, 2,3-dimethylbutadiene, 2-phenyl-1,3-butadiene, 1,3-hexadiene and the like can be suitably used. Further, these may be used either alone or as a combination of two or more thereof.

Of these, 1,3-butadiene, isoprene and 2,3-dimethyl-1,3-butadiene are preferable.

Further, when the base polymer contains the structural unit derived from the aromatic vinyl compound, as the aromatic vinyl compound for obtaining the structural unit derived from the aromatic vinyl compound, a compound having at least one vinyl group bonded to an aromatic group having a carbon ring or a heterocyclic ring, or a derivative thereof is used.

Specifically, for example, styrene, 2-methylstyrerne, 3-methylstyrene, 4-methylstyrene, α-methylstyrene, 2,4-dimethylstyrene, 2,4-diisopropylstyrene, 4-tert-butylstyrene, divinylbenzene, tert-butoxystyrene, vinylbenzyldimethylamine, (4-vinylbenzyl)dimethylaminoethyl ether, N,N-dimethylaminoethylenestyrene, 2-t-butylstyrene, 3-t-butylstyrene, 4-t-butylstyrene, diphenylethylene and the like can be suitably used. Further, these may be used either alone or as a combination of two or more thereof.

Of these, styrene is preferable.

It is preferable that such a base polymer is one produced by a solution polymerization process. Further, as the solution polymerization process, a living anion polymerization process is preferable.

Production of the base polymer by the solution polymerization process makes it easy to introduce the specific functional group into the base polymer by a technique described later.

Although various techniques can be used as a method for introducing the specific functional group into one site of one polymer molecule of the base polymer, examples thereof include, for example, a technique of forming the base polymer by the living anion polymerization process, specifically conducting living anion polymerization with using a monofunctional polymerization initiator such as n-butyllithium, and using a compound (hereinafter also referred to as a "compound for functional group introduction") for introducing the specific functional group, as a polymerization terminator.

The compounds for specific functional group introduction include, for example, N,N-bis(trimethylsilyl)aminopropylmethyldimethoxysilane, N,N-bis(tri-methylsilyl)aminopropyltrimethoxysilane, N,N-bis(trimethylsilyl)aminopropyltriethoxysilane, N,N-bis(trimethylsilyl)aminopropylmethyldiethoxysilane, N,N-bis(trimethylsilyl)aminoethyltrimethoxysilane, N,N-bis(trimethylsilyl)aminoethyl-triethoxysilane, N,N-bis(trimethylsilyl)aminoethylmethyldimethoxysilane, N,N-bis-(trimethylsilyl)aminoethylmethyldiethoxysilane, N,N-bis(triethylsilyl)amino-propylmethyldimethoxysilane, N,N-bis(triethylsilyl)aminopropyltrimethoxysilane, N,N-bis(triethylsilyl)aminopropyltriethoxysilane, N,N-bis(triethylsilyl)aminopropyl-methyldiethoxysilane, N,N-bis(triethylsilyl)aminopropyldimethylmethoxysilane, N,N-bis(triethylsilyl)aminopropyldimethylethoxysilane, N,N-bis(triethylsilyl)aminoethyltri-methoxysilane, N,N-bis(triethylsilyl)aminoethyltriethoxysilane, N,N-bis(triethyl-silyl)aminoethylmethyldimethoxysilane, N,N-bis(triethylsilyl)amino-ethylmethyldiethoxysilane, N,N-bis(t-butyldimethylsilyl)aminopropyltrimethoxysilane, N,N-bis(t-butyldimethylsilyl)aminopropyltriethoxysilane, N,N-bis(t-butyldi-methylsilyl)aminopropylmethyldimethoxysilane, N,N-bis(t-butyldimethyl-silyl)aminopropylmethyldiethoxysilane, N,N-bis(t-butyldimethylsilyl)aminopropyl-dimethylmethoxysilane, N,N-bis(t-butyldimethylsilyl)aminopropyldimethylethoxy-silane, and of these compounds, in a compound in which amino sites are protected with a plurality of trialkylsilyl groups, a compound in which the plurality of trialkylsilyl groups are partially substituted with a methyl group, an ethyl group, a propyl group or a butyl group;

bis[3-(triethoxysilyl)propyl]trimethylsilylamine, bis[3-(trimethoxysilyl)propyl]trimethylsilylamine, 3-dimethylaminopropyltrimethoxysilane, 3-diethylaminopropyltrimethoxysilane, 3-dimethylaminopropyltriethoxysilane, 3-di-ethylaminopropyltriethoxysilane, 3-ethylmethylaminopropyltrimethoxysilane, 3-ethylmethylaminopropyltriethoxysilane, 3-dimethylaminopropylmethyldimethoxysilane, 3-diethylaminopropylmethyldimethoxysilane, 3-dimethylaminopropylethyldimethoxysilane, 3-diethylaminopropylethyldimethoxysilane, 3-dimethylaminopropyldimethylmethoxy-silane, 3-dimethylaminopropyldiethylmethoxysilane, 3-diethylaminopropyldimethylmethoxysilane, 3-diethylaminopropyldiethylmethoxysilane, 3-ethylmethylaminopropylmethyldimethoxysilane, 3-methyl-3-ethylaminopropylethyl-dimethoxysilane, bis-(3-dimethylaminopropyl)-dimethoxysilane, bis-(3-ethylmethylaminopropyl)-diethoxysilane, bis-[(3-dimethylamino-3-methyl)propyl]-dimethoxysilane, bis-[(3-ethylmethylamino-3-methyl)propyl]-dimethoxysilane, 3-dimethylaminopropylmethyldiethoxysilane, 3-diethylaminopropylmethyldiethoxy-silane, 3-dimethylaminopropylethyldiethoxysilane, 3-diethyl-aminopropylethyldiethoxysilane, 3-dimethylaminopropyldimethylethoxysilane, 3-dimethylaminopropyldiethylethoxysilane, 3-diethylaminopropyldimethylethoxysilane, 3-diethylaminopropyldiethylethoxysilane, 3-ethylmethylaminopropylmethyldiethoxysilane, 3-ethylmethylaminopropylethyldiethoxysilane, [3-(diethylamino)propyl]trimethoxysilane, [3-(dimethylamino)propyl]triethoxysilane, 3-di(methoxymethyl)aminopropyltrimethoxysilane, 3-di(methoxyethyl)aminopropyltrimethoxysilane, 3-di(methoxymethyl)aminopropyltriethoxysilane, 3-di(methoxyethyl)aminopropyltriethoxysilane, 3-di(ethoxyethyl)aminopropyl-trimethoxysilane, 3-di(ethoxymethyl)aminopropyltrimethoxysilane, 3-di(ethoxy-ethyl)aminopropyltriethoxysilane, 3-di(ethoxymethyl)aminopropyltriethoxysilane, N-(1,3-dimethylbutylidene)-3-(triethoxysilyl)-1-propaneamine, N-(1-methyl-propylidene)-3-(triethoxysilyl)-1-propaneamine, N-ethylidene-3-(triethoxysilyl)-1-propaneamine, N-(4-N,N-dimethylaminobenzylidene)-3-(triethoxysilyl)-1-propane-amine, N-(cyclohexylidene)-3-(triethoxysilyl)-1-propaneamine, N-(cyclohexylidene)-3-(trimethoxysilyl)-2-propaneamine, N-(cyclohexylidene)-3-(methyldiethoxysilyl)-3-propaneamine and N-(cyclohexylidene)-3-(ethyldimethoxysilyl)-4-propaneamine;

N,N',N'-tris(trimethylsilyl)-N-(2-aminoethyl)-3-aminopropyltriethoxysilane, N,N',N'-tris(trimethylsilyl)-N-(2-aminoethyl)-3-aminopropylmethyldiethoxysilane, N,N',N'-tris(trimethylsilyl)-N-(2-aminoethyl)-3-aminopropyltrimethoxysilane, N,N',N'-tris(trimethylsilyl)-N-(2-aminoethyl)-3-aminopropylmethyldimethoxysilane, and of these compounds, in a compound in which amino sites are protected with a plurality of trialkylsilyl groups, a compound in which the plurality of trialkylsilyl groups are partially substituted with a methyl group, an ethyl group, a propyl group or a butyl group;

N-[3-(trimethoxysilyl)-propyl]-N,N'-diethyl-N'-trimethylsilyl-ethane-1,2-diamine, N-[3-(triethoxysilyl)-propyl]-N,N'-diethyl-N'-trimethylsilyl-ethane-1,2-diamine, N-[3-(methyldimethoxysilyl)-propyl]-N,N'-diethyl-N'-trimethylsilyl-ethane-1,2-diamine, N-[3-(methyldimethoxysilyl)-propyl]-N,N'-diethyl-N'-trimethylsilyl-p-phenylenediamine, N-[3-(triethoxysilyl)-propyl]-N,N'-diethyl-N'-trimethylsilyl-p-phenylenediamine, N-[3-(diethoxymethylsilyl)-propyl]-N-ethyl-N'-(2-ethoxyethyl)-N'-trimethylsilyl-ethane-1,2-diamine, N-[3-(tripropoxysilyl)-propyl]-N-propyl-N'-(2-ethoxyethyl)-N'-triethylsilyl-p-phenylenediamine, N-[2-(diethoxymethylsilyl)-1-methylethyl]-N-ethyl-N'-(2-diethylamino-ethyl)-N'-triethylsilyl-ethane-1,2-diamine, N-[3-(triethoxysilyl)-propyl]-N-ethyl-N'-(2-diethylaminoethyl)-N'-triethylsilyl-ethane-1,2-diamine, N-[2-(trimethoxysilyl)-ethyl]-N,N',N'-trimethylethane-1,2-diamine, N-[2-(dimethoxymethylsilyl)-ethyl]-N-ethyl-N',N'-dimethylethane-1,2-diamine, N-[3-(trimethoxysilyl)-propyl]-N,N',N'-trimethylolpropane-1,3-diamine, N-[3-(di-methoxymethylsilyl)-propyl]-N-ethyl-N',N'-dimethylpropane-1,3-diamine, N-[3-(triethoxysilyl)-propyl]-N,N',N'-triethyl-2-methylpropane-1,3-diamine, N-[3-(dimethoxymethylsilyl)-propyl]-2,N,N',N'-tetramethylpropane-1,3-diamine, N-(2-dimethylaminoethyl)-N'-[2-(trimethoxysilyl)-ethyl]-N,N'-dimethylethane-1,2-diamine, N-[2-(diethoxypropylsilyl)-ethyl]N'-(3-ethoxypropyl)-N,N-dimethylethane-1,2-diamine, N-[2-(trimethoxysilyl)-ethyl]-N'-methoxymethyl-N,N-dimethylethane-1,2-diamine, N-[2-(trimethoxysilyl)-ethyl]-N,N'-dimethyl-N'-(2-trimethylsilylethyl)-ethane-1,2-diamine, N-[2-(triethoxysilyl)-ethyl]-N,N'-diethyl-N'-(2-dibutylmethoxysilylethyl)-ethane-1,2-diamine, 1-(3-triethoxysilylpropyl)-2,2,5,5-tetramethyl-1-aza-2,5-disilacyclopentane, 1-(3-trimethoxysilylpropyl)-2,2,5,5-tetramethyl-1-aza-2,5-disilacyclopentane, 1-(3-ethyldiethoxysilylpropyl)-2,2,5,5-tetramethyl-1-aza-2,5-disilacyclopentane, 1-(3-methyldimethoxysilylpropyl)-2,2,5,5-tetramethyl-1-aza-2,5-disilacyclopentane, 1-trimethylsilyl-2,2-dimethoxy-1-aza-2-silacyclopentane, 3-[3-(trimethylsilylethylamino)-1-pyrrolidinyl]-propyl-methyldiethoxysilane, 3-[3-(trimethylsilylpropylamino)-1-pyrrolidinyl]-propyl-triethoxysilane, 3-(4-trimethylsilyl-1-piperazino)propylmethyldimethoxysilane, 3-(4-trimethylsilyl-1-piperazino)propyltriethoxysilane, 3-(4-trimethylsilyl-1-piperazino)propyltributoxysilane, 4-(4-trimethylsilyl-1-piperazinyl)butyltriethoxysilane, 1-[3-(triethoxysilyl)-propyl]-4-methylpiperazine, 1-[3-(diethoxyethylsilyl)-propyl]-4-methylpiperazine, 2-(triethoxysilyl)-1,4-diethylpiperazine, 2-(dimethoxymethylsilyl)-1,4-dimethylpiperazine, 2-(3-triethoxysilyl-propyl)-1,4-diethylpiperazine, 2-(3-dimethoxymethylsilyl-propyl)-1,4-dimethylpiperazine, 3-piperidinopropyltrimethoxysilane, 3-piperidinopropyltriethoxysilane, 3-piperidinopropylmethyldimethoxysilane, 3-piperidinopropylethyldimethoxysilane, 3-piperidinopropylmethyldiethoxysilane, 3-piperidinopropylethyldiethoxysilane, 3-(3-trimethylsilyl-1-imidazolidinyl)propyl-ethyldiethoxysilane, 3-(3-trimethylsilyl-1-imidazolidinyl)propyltriethoxysilane, 1-[3-(trimethoxysilyl)-propyl]-3-methylimidazolidine, 1-[3-(diethoxyethylsilyl)-propyl]-3-ethylimidazolidine, 1-(2-ethoxyethyl)-3-[3-(trimethoxysilyl)-propyl]-imidazolidine, 2-(trimethoxysilyl)-1,3-dimethylimidazolidine, 2-(3-trimethoxysilyl-propyl)-1,3-di-methylimidazolidine, 2-(diethoxysilylethyl)-1,3-diethylimidazolidine, 2-[3-(2-di-methylaminoethyl)-2-(ethyldimethoxysilyl)-imidazolidine-1-yl]-ethyl-dimethylamine, 2-(3-diethoxysilyl-propyl)-1,3-diethylimidazolidine, 2-[3-(2-dimethylamino-ethyl)-2-(3-ethyldimethoxysilyl-propyl)-imidazolidine-1-yl]-ethyl-dimethylamine, N-(3-trimethoxysilylpropyl)-4,5-dihydroimidazole, N-(3-triethoxysilylpropyl)-4,5-dihydroimidazole, N-(3-trimethoxysilylpropyl)-4,5-imidazole, N-(3-triethoxy-silylpropyl)-4,5-imidazole, 3-(3-trimethylsilyl-1-hexahydropyrimidinyl)propylmethyldimethoxysilane, 3-(3-trimethylsilyl-1-hexahydropyrimidinyl)propyltriethoxysilane, 1-[3-(triethoxysilyl)-propyl]-3-methylhexahydropyrimidine, 1-[3-(dimethoxymethylsilye-propyl]-3-methylhexahydropyrimidine, 3-[3-(tributoxysilyl)-propyl]-1-methyl-1,2,3,4-tetrahydropyrimidine, 3-[3-(dimethoxymethylsilyl)-propyl]-1-ethyl-1,2,3,4-tetrahydropyrimidine, 2-{3-[3-(trimethoxysilyl)-propyl]-tetrahydropyrimidine-1-yl}-ethyldimethylamine, 5-(triethoxysilyl)-1,3-dipropylhexahydropyrimidine, 5-(diethoxy-ethylsilyl)-1,3-diethylhexahydropyrimidin, 5-(trimethoxysilyl)-1,3-bis-(2-methoxyethyl)-hexahydropyrimidine, 5-(ethyldimethoxysilanyl)-1,3-bis-trimethylsilanylhexahydropyrimidine, 5-(3-triethoxysilyl-propyl)-1,3-dipropylhexa-hydropyrimidine, 5-(3-diethoxy-ethylsilyl-propyl)-1,3-diethylhexahydropyrimidine, 5-(3- trimethoxysilyl-propyl)-1,3-bis-(2-methoxyethyl)-hexahydropyrimidine, 5-(3-ethyl-dimethoxysilyl-propyl)-1,3-bis-(2-trimethylsilylethyl)-hexahydropyrimidine, 3-morpholinopropyltrimethoxysilane, 3-morpholinopropyltriethoxysilane, 3-morpholinopropylmethyldimethoxysilane, 3-morpholinopropylethyldimethoxysilane, 3-morpholinopropylmethyldiethoxysilane, 3-morpholinopropylethyldiethoxysilane, 3-hexamethyleneiminopropyltrimethoxysilane, 3-hexamethyleneiminopropyltriethoxysilane, 3-hexamethyleneiminopropylmethyldimethoxysilane, 3-hexa-methyleneiminopropylethyldimethoxysilane, 3-hexamethyleneiminopropylmethyldi-ethoxysilane, 3-hexamethyleneiminopropylethyldiethoxysilane, 3-di(t-butyldimethylsilyl)aminopropyltrimethoxysilane, 3-di(t-butyldimethylsilyl)-aminopropyltriethoxysilane, 3-di(t-butyldimethylsilyl)aminopropylmethyl-dimethoxysilane, 3-di(t-butyldimethylsilyl)aminopropylmethyldiethoxysilane, 3-di(t-butyldimethylsilyl)aminopropyldimethylmethoxysilane, 3-di(t-butyldimethylsilyl)-aminopropyldimethylethoxysilane, N-(1,3-dimethylbutylidene)-3-(trimethoxysilyl)-1-propaneamine, N-(cyclohexylidene)-3-(trimethoxysilyl)-1-propaneamine, N-(cyclohexylidene)-3-(methyldiethoxysilyl)-1-propaneamine, N-(cyclohexylidene)-3-(ethyldimethoxysilyl)-1-propaneamine, [(3-methyl-3-ethylamino)propyl]trimethoxy-silane, [(3-methyl-3-ethylamino)propyl]triethoxysilane, P,P-bis(tri-methylsilyl)phosphinopropylmethyldimethoxysilane, P,P-bis(trimethylsilyl)phosphinopropyltrimethoxysilane, P,P-bis-(trimethylsilyl)phosphinopropyltriethoxysilane, P,P-bis(trimethyl-silyl)phosphinopropylmethyldiethoxysilane, P,P-bis(trimethylsilyl)phosphino-ethyltrimethoxysilane, P,P-bis(trimethylsilyl)phosphinoethyltriethoxysilane, P,P-bis(trimethylsilyl)phosphinoethylmethyldimethoxysilane, P,P-bis(trimethylsilyl)-phosphinoethylmethyldiethoxysilane, 3-dimethylphosphinopropyltrimethoxysilane, 3-diethylphosphinopropyltrimethoxysilane, 3-dimethylphosphinopropyltriethoxysilane, 3-diethylphosphinopropyltriethoxysilane, 3-ethylmethylphosphinopropyltrimethoxysilane, 3-ethylmethyl-phosphinopropyltriethoxysilane, 3-dimethylphosphinopropylmethyldimethoxysilane, 3-diethylphosphinopropylmethyldimethoxysilane, 3-dimethylphosphinopropyl-ethyldimethoxysilane, 3-diethylphosphinopropylethyldimethoxysilane, 3-dimethylphosphinopropyldimethylmethoxysilane, 3-dimethylphosphino-propyldiethylmethoxysilane, 3-diethylphosphinopropyldimethylmethoxysilane, 3-diethylphosphinopropyldiethylmethoxysilane, 3-ethylmethylphosphinopropylmethyl-dimethoxysilane, 3-ethylmethylphosphinopropylethyldimethoxysilane, 3-dimethylphosphinopropylmethyldiethoxysilane, 3-diethylphosphinopropylmethyl-diethoxysilane, 3-dimethylphosphinopropylethyldiethoxysilane, 3-diethylphosphinopropylethyldiethoxysilane, 3-dimethylphosphinopropyldimethylethoxysilane, 3-dimethyl-phosphinopropyldiethylethoxysilane, 3-diethylphosphinopropyldimethylethoxysilane, 3-diethylphosphinopropyldiethylethoxysilane, 3-ethylmethylphosphinopropylmethyl-diethoxysilane, 3-ethylmethylphosphinopropylmethyldiethoxysilane, 3-diphenylphosphinopropyltrimethoxysilane, 3-diphenylphosphinopropyltriethoxysilane, 3-diphenylphosphinopropylmeryldimethoxysilane, 3-diphenylphosphinopropylmeryl-diethoxysilane, S-trimethylsilylmercaptopropylmethyldimethoxysilane, S-trimethylsilylmercaptopropyltrimethoxysilane, S-trimethylsilylmercaptopropyltriethoxysilane, S-trimethylsilylmercaptopropylmethyldiethoxysilane, S-trimethylsilylmercaptoethyltrimethoxysilane, S-trimethylsilylmercaptoethyltriethoxysilane, S-trimethylsilylmercaptoethylmethyldimethoxysilane, S-trimethylsilylmercaptoethyl-methyldiethoxysilane and the like.

Of these, N,N-bis(triethylsilyl)aminopropylmethyldimethoxysilane, N,N-bis(trimethylsilyl)aminopropylmethyldimethoxysilane, N,N-bis(trimethylsilyl)aminopropylmethyldiethoxysilane, N,N-bis(trimethylsilyl)aminopropyltriethoxysilane, 1-(3-triethoxysilylpropyl)-2,2,5,5-tetramethyl-1-aza-2,5-disilacyclopentane, N,N',N'-tris-(trimethylsilyl)-N-(2-aminoethyl)-3-aminopropyltriethoxysilane, 1-trimethylsilyl-2,2-dimethoxy-1-aza-2-silacyclopentane, N-[3-(trimethoxysilyl)-propyl]-N,N'-diethyl-N'-trimethylsilyl-ethane-1,2-diamine, N-[3-(triethoxysilyl)-propyl]-N,N'-diethyl-N'-trimethylsilyl-ethane-1,2-diamine, 3-(4-trimethylsilyl-1-piperazino)propyltriethoxy-silane, N-[2-(trimethoxysilyl)-ethyl]-N,N',N'-trimethylethane-1,2-diamine, 1-[3-(triethoxysilyl)-propyl]-4-methylpiperazine, 2-(trimethoxysilyl)-1,3-di-methylimidazolidine, 2-(3-trimethoxysilyl-propyl)-1,3-dimethylimidazolidine, 3-di-methylaminopropyltrimethoxysilane, 3-diethylaminopropyltrimethoxysilane, 3-di-methylaminopropyltriethoxysilane, 3-diethylaminopropyltriethoxysilane, bis[3-(triethoxysilyl)propyl]trimethylsilylamine, bis[3-(trimethoxysilyl)propyl]trimethylsilylamine, N-(1,3-dimethylbutylidene)-3-(triethoxysilyl)-1-propaneamine, N-(1-methylpropylidene)-3-(triethoxysilyl)-1-propaneamine, N-(3-trimethoxysilylpropyl)-4,5-dihydroimidazole, N-(3-triethoxysilylpropyl)-4,5-dihydroimidazole, N-(3-trimethoxysilylpropyl)-4,5-imidazole, N-(3-triethoxysilylpropyl)-4,5-imidazole, bis-(3-dimethylaminopropyl)-dimethoxysilane, [3-(diethylamino)propyl]trimethoxysilane, [3-(dimethylamino)propyl]triethoxysilane, 3-diphenylphosphinopropyltrimethoxysilane, 3-diphenylphosphinopropyltriethoxysilane, S-trimethylsilylmercapto-propylmethyldimethoxysilane, S-trimethylsilylmercaptopropyltrimethoxysilane, S-tri-methylsilylmercaptopropyltriethoxysilane and S-trimethylsilylmercaptopropylmethyl-diethoxysilane are preferable.

Further, with respect to a trimethylsilyl group-containing compound of the above-mentioned compounds for functional group introduction, a part or the whole of the trimethylsilyl groups may be substituted with hydrogen in the resulting hydrocarbyloxysilyl groups. Furthermore, of the hydrogen-substituted ones, with respect to a group (hereinafter also referred to as an "onium-forming group") that can form an onium by an action of an onium-forming agent, an onium salt structure may be formed. The onium-forming groups include, for example, nitrogen-containing functional groups represented by an amino group, phosphorus-containing groups represented by a phosphino group, sulfur-containing groups represented by a thiol group, and the like.

Here, as the onium-forming agents, for example, metal halides such as silicon halide compounds, tin halide compounds, aluminum halide compounds, titanium halide compounds zirconium halide compounds, germanium halide compounds, zinc halide compounds and gallium halide compounds, sulfuric acid esters, phosphoric acid esters, carbonic acid esters, nitric acid esters, inorganic acids such as hydrofluoric acid, hydrochloric acid, hydrobromic acid, hydroiodic acid, sulfuric acid, nitric acid, carbonic acid and phosphoric acid, inorganic acid salts such as potassium fluoride, tetramethylammonium fluoride, tetra-n-butylammonium fluoride, organic acids such as carboxylic acids and sulfonic acids, and the like are used.

Specific examples of the onium-forming agents include silicon tetrachloride, tin tetrachloride, trimethylsilyl chloride, dimethyldichlorosilane, methyltrichlorosilane, methyldichlorosilane, diethylaluminum chloride, ethylaluminum sesquichloride, ethylaluminum dichloride, titanium tetrachloride, titanocene dichloride, zirconium tetrachloride, zirconocene dichloride, germanium tetrachloride, gallium trichloride, zinc chloride, diethyl sulfate, dimethyl sulfate, magnesium laureth sulfate, trimethyl phosphate, triethyl phosphate, tributyl phosphate, 2-ethylhexyl phosphate, triphenyl phosphate, tricresyl phosphate, dimethyl carbonate, diethyl carbonate, ethylene carbonate, propylene carbonate, nitrocellulose, nitroglycerine, nitroglycol, formic acid, acetic acid, oxalic acid, maleic acid, citric acid, malic acid, fumaric acid, malonic acid, acrylic acid, crotonic acid, succinic acid, glutaric acid, itaconic acid, tartaric acid, sebacic acid, terephthalic acid, isophthalic acid, β-mercaptopropionic acid, benzenesulfonic acid, p-toluenesulfonic acid, hydrofluoric acid, hydrochloric acid, hydrobromic acid, hydroiodic acid, sulfuric acid, nitric acid, carbonic acid, phosphoric acid, potassium fluoride, tetramethylammonium fluoride, tetra-n-butylammonium fluoride and the like.

From the viewpoint of cold flow properties of the rubber elastic body obtained from the rubber composition, the conjugated diene polymer (A) may also be one coupled with a multifunctional modifier (hereinafter also referred to as a "coupling multifunctional compound").

A coupling reaction in which the conjugated diene polymer (A) is coupled with the coupling multifunctional compound may be conducted either before or after introduction of the specific functional group into the base polymer, or may be performed at the same time of the reaction for introducing the specific functional group.

The coupling multifunctional compounds include at least one compound selected from the group consisting of (a) isocyanate compounds and/or isothiocyanate compounds, (b) amide compounds and/or imide compounds, (c) pyridyl-substituted ketone compounds and/or pyridyl-substituted vinyl compounds, (d) silicon compounds, (e) ester compounds, (f) ketone compounds and (g) tin compounds.

Suitable examples of the isocyanate compounds of the above-mentioned (a) include 2,4-tolylene diisocyanate, 2,6-tolylene diisocyanate, diphenylmethane diisocyanate, polymeric type diphenylmethane diisocyanate (C-MDI), isophorone diisocyanate, hexamethylene diisocyanate, 1,3,5-benzene triisocyanate and the like.

Further, suitable examples of the isothiocyanate compounds of the above-mentioned (a) include phenyl-1,4-diisothiocyanate and the like.

Suitable examples of the amide compounds of the above-mentioned (b) include succinamide, phthalamide, N,N,N',N'-tetramethylphthalamide, oxamide, N,N,N',N'-tetramethyloxamide and the like.

Further, suitable examples of the imide compounds of the above-mentioned (b) include succinimide, N-methylsuccinimide, maleimide, N-methylmaleimide, phthalimide, N-methylphthalimide and the like.

Suitable examples of the pyridyl-substituted ketone compounds of the above-mentioned (c) include dibenzoylpyridine, diacetylpyridine and the like.

Further, suitable examples of the pyridyl-substituted vinyl compounds of the above-mentioned (c) include divinylpyridine and the like.

Suitable examples of the silicon compounds of the above-mentioned (d) include dibutyldichlorosilicon, methyltrichlorosilicon, methyldichlorosilicon, tetra-chlorosilicon, triethoxymethylsilane, triphenoxymethylsilane, trimethoxysilane, methyltriethoxysilane, 4,5-epoxyheptylmethyldimethoxysilane, bis(triethoxysilyl-propyl)tetrasulfide and the like.

Suitable examples of the ester compounds of the above-mentioned (e) include diethyl adipate, diethyl malonate, diethyl phthalate, diethyl glutarate, diethyl maleate and the like.

Specific examples of the ketone compounds of the above-mentioned (f) suitably include N,N,N',N'-tetramethyl-4,4'-diaminobenzophenone, N,N,N',N'-tetraethyl(4,4'-diamino)-benzophenone, N,N-dimethyl-1-aminobenzoquinone, N,N,N',N'-tetramethyl-1,3-diaminobenzoquinone, N,N-dimethyl-1-amino-anthraquinone, N,N,N',N'-tetramethyl-1,4-diaminoanthraquinone and the like.

Suitable examples of the tin compounds of the above-mentioned (g) include tetrachlorotin, tetrabromotin, trichlorobutyltin, trichloromethyltin, trichlorooctyltin, dibromodimethyltin, dichlorodimethyltin, dichlorodibutyltin, dichlorodioctyltin, 1,2-bis(trichlorostannyl)ethane, 1,2-bis(methyldichlorostannylethane), 1,4-bis(trichloro-stannyl)butane, 1,4-bis(methyldichlorostannyl)butane, ethyltin tristearate, butyltin trisoctanoate, butyltin trisstearate, butyltin trislaurate, dibutyltin bisoctanoate, dibutyltin bisstearate, dibutyltin bislaurate and the like.

These compounds may be used either alone or as a combination of tow or more thereof.

In such a conjugated diene polymer (A), the content of 1,2-vinyl bonds in the structural unit derived from a conjugated diene compound is preferably from 30 to 70 mol %.

When the content of 1,2-vinyl bonds is excessively small, there is a possibility that a balance between wet grip performance and rolling resistance in the rubber elastic body obtained from the rubber composition is deteriorated.

On the other hand, when the content of 1,2-vinyl bonds is excessively large, there is a possibility that wear resistance of the rubber elastic body obtained from the rubber composition is extremely decreased.

Here, the content of 1,2-vinyl bonds in the structural unit derived from a conjugated diene compound can be calculated from a 500 MHz $^1$H-NMR spectrum.

The contained ratio of the conjugated diene polymer (A) is preferably from 30 to 95% by mass based on 100% by mass of the rubber component.

(Polymer (B))

The polymer (B) constitutes the rubber component, together with the conjugated diene polymer (A), and has the specific functional groups at a plurality of sites of one molecule of the polymer, namely at a plurality of sites in a molecule.

This polymer (B) may be either one in which one specific functional group is introduced into each of the plurality of sites of one molecule of the polymer, or one in which two or more specific functional groups are introduced thereinto.

Here, the polymer in which two or more specific functional groups are introduced into one site of one molecule of the polymer includes one having a constitution in which two or more specific functional groups are each independently present (specifically, for example, one having a constitution in which one specific functional group is present as a substituent group of another specific functional group, or one having a constitution in which one specific functional group is present next to another specific functional group across a group which is derived from a hydrocarbon compound and has 5 or less carbon atoms).

It is preferable that the specific functional group in the polymer (B) is at least one functional group selected from the group consisting of a hydrocarbyloxysilyl group, a primary amino group, a secondary amino group, a tertiary amino group, a thiol group, an epoxy group, a thioepoxy group, an oxetane group and a hydrocarbylthio group. Of these, a hydrocarbyloxysilyl group is preferable.

This polymer (B) comprises a base polymer into which the plurality of specific functional groups are introduced, and the introduction sites thereof may be any, as long as the specific functional groups are introduced into the plurality of sites of one molecule of the polymer. Although the plurality of specific functional groups may be introduced into any one of a molecular end, a molecular side chain and a molecule, the groups are preferably introduced into at least one molecular end, and particularly preferably into both molecular ends.

It is preferable that the base polymer of the polymer (B) is a conjugated diene polymer having a structural unit derived from a conjugated diene compound.

As the conjugated diene polymers acting as the base polymers of the polymer (B), the polymers exemplified as the conjugated diene polymers that can be used as the base polymers of the conjugated diene polymer (A) can be used.

Here, when the base polymer of the polymer (B) is the conjugated diene polymer, the content of 1,2-vinyl bonds in the structural unit derived from a conjugated diene compound is preferably from 30 to 70 mol %, in the polymer (B).

When the content of 1,2-vinyl bonds is excessively small, there is a possibility that a balance between wet grip performance and rolling resistance in the rubber elastic body obtained from the rubber composition is deteriorated.

On the other hand, when the content of 1,2-vinyl bonds is excessively large, there is a possibility that wear resistance of the rubber elastic body obtained from the rubber composition is extremely decreased.

Preferable specific examples of the polymer (B) include one having a constitution in which a base polymer is of the same kind as the base polymer in the conjugated diene polymer (A), and in which specific functional groups of the same kind as the specific functional groups constituting the conjugated diene polymer (A) are introduced.

Although various techniques can be used as a method for introducing the specific functional groups into the plurality of sites of one polymer molecule of the base polymer, examples thereof include, for example, a technique of forming the base polymer by the living anion polymerization process, specifically conducting living anion polymerization with using a multifunctional polymerization initiator, and using a compound for introducing the specific functional groups as a polymerization terminator.

The multifunctional polymerization initiators used in the living polymerization include bifunctional anion living polymerization initiators (dilithium multifunctional initiators) obtained, for example, by reacting diisopropenylbenzene and butyllithium in the presence of trioctylamine, and the like.

As the compounds for introducing the specific functional groups, the compounds exemplified as the compounds for functional group introduction for introducing the specific functional groups into the base polymer of the conjugated diene polymer (A) can be used.

Further, as the compounds for introducing the specific functional groups, for example, 1-(4-N,N-dimethylaminophenyl)-1-phenylethylene, 1-(4-N,N-diethylamino-phenyl)-1-phenylethylene, 1-(4-N,N-dipropylaminophenyl)-1-phenylethylene, 1-(4-N,N-dibutylaminophenyl)-1-phenylethylene, 1-(4-N,N-dimethoxyaminophenyl)-1-phenylethylene, 1-(4-N,N-diethoxyaminophenyl)-1-phenylethylene, 1-(4-N,N-dipropoxyaminophenyl)-1-phenylethylene, 1-(4-N,N-dibutoxyaminophenyl)-1-phenylethylene, tert-butoxydimethylsilylstyrene, isopropoxydimethylsilylstyrene and the like can also be used, in addition to the compounds exemplified as the compounds for functional group introduction with respect to the conjugated diene polymer (A). Of these, 1-(4-N,N-dimethylaminophenyl)-1-phenylethylene is preferable, from the viewpoint that fuel cost-saving properties can be significantly improved in the rubber elastic body obtained from the rubber composition.

From the viewpoint of cold flow properties of the rubber elastic body obtained from the rubber composition, the polymer (B) may also be one coupled with the coupling multifunctional compound.

A coupling reaction in which the polymer (B) is coupled with the coupling multifunctional compound may be conducted either before or after introduction of the specific functional groups into the base polymer, or may be performed at the same time of the reaction for introducing the specific functional groups.

As the coupling multifunctional compounds, the compounds exemplified as the compounds that can be used as the coupling multifunctional compounds for coupling the conjugated diene polymer (A) can be used.

The contained ratio of the polymer (B) is preferably from 1 to 40% by mass based on 100% by mass of the rubber component.

In the rubber composition of the present invention, an optional ingredient may be contained in the rubber component, in addition to the conjugated diene polymer (A) and the polymer (B) as essential ingredients. The optional ingredients include, for example, other known rubber components usable in rubber compositions for tires, such as natural rubber, butadiene rubber, butyl rubber, synthetic isoprene rubber, styrene-butadiene copolymerized rubber, ethylene-α-olefin copolymerized rubber, ethylene-a-olefin-diene copolymerized rubber, acrylonitrile-butadiene copolymerized rubber, chloroprene rubber, halogenated butyl rubber and mixtures thereof, and the like. Of these, it is preferable to contain natural rubber or butadiene rubber, for the reason that a balance between wet grip performance and rolling resistance can be highly achieved with maintaining wear resistance, in the rubber elastic body obtained from the rubber composition.

The contained ratio of the optional ingredient in the rubber component is preferably 45% by mass or less based on 100% by mass of the rubber component.

(Filler (C))

The filler (C) contains silica as an essential ingredient, and may contain an optional ingredient, together with the silica as the essential ingredient.

As the silica constituting the filler (C), silica generally used as a filler can be used. However, synthetic silicic acid having a primary particle size of 50 nm or less is preferable from the viewpoint of rolling resistance and impact resilience of the rubber elastic body obtained from the rubber composition.

The contained ratio of the silica constituting the filler (C) is preferably from 10 to 120 parts by mass, and more preferably from 20 to 100 parts by mass, based on 100 parts by mass of the rubber component containing the conjugated diene polymer (A) and the polymer (B).

When the contained ratio of the silica (C) is excessively small and excessively small, there is a possibility that a balance between hardness and rolling resistance is deteriorated in the rubber elastic body obtained from the rubber composition, in each case.

In the filler (C), the optional ingredient may be contained, in addition to the silica as the essential ingredient. The optional ingredients include, for example, inorganic oxides such as aluminum oxide, titanium oxide, calcium oxide and magnesium oxide, inorganic hydroxides such as aluminum hydroxide and magnesium hydroxide, carbonates such as magnesium carbonate, and the like. These may be used either alone or as a combination of two or more thereof.

In the rubber composition of the present invention, an optional ingredient may be contained as needed, in addition to the conjugated diene polymer (A), the polymer (B) and the filler (C) as the essential ingredients.

Specific examples of the optional ingredients include, for example, reinforcing agents such as carbon black, softening agents such as oil, silane coupling agents, waxes, antioxidants, stearic acid, zinc oxide, vulcanizing agents or crosslinking agents such as sulfur, vulcanization accelerators and the like, in addition to the above-mentioned optional ingredients with respect to the rubber component.

The rubber composition of the present invention as described above is an unvulcanized rubber composition, and the rubber elastic body is formed, for example, by a crosslinking treatment such as vulcanization. The conjugated diene polymer (A) and the polymer (B) are contained as the rubber component, together with the filler (C) containing silica. From the relationship between both these conjugated diene polymer (A) and polymer (B), the conjugated diene polymer (A) acts so as to increase dispersibility of the silica, and on the other hand, the polymer (B) acts so as to suppress dispersibility of the silica from being excessively increased. Accordingly, dispersibility of the silica can be controlled by the mixing ratio thereof. For this reason, dispersibility of the silica can be improved from the viewpoint of a balance between rolling resistance and impact resilience in the rubber elastic body obtained from the rubber composition.

According to the rubber composition of the present invention, therefore, the elastic body having small rolling resistance and excellent impact resilience can be obtained.

Such a rubber composition of the present invention can be produced by kneading the optional ingredient as needed, together with the conjugated diene polymer (A), the polymer (B) and the filler (C) as the essential ingredients, for example, with using a plastomill.

A method for producing a rubber composition of the present invention is characterized by kneading a conjugated diene polymer (A) having a group with bonding reactivity to silica only at one site of one molecule of the polymer, a polymer (B) having groups with bonding reactivity to silica at a plurality of sites of one molecule of the polymer and a filler (C) containing silica. In this kneading, it is preferable to knead the conjugated diene polymer (A) and the filler (C), and thereafter to knead the resulting kneaded material and the polymer (B).

Specifically, firstly, the conjugated diene polymer (A), the filler (C) and the optional ingredient as needed are kneaded, and thereafter, the polymer (B) is added to the kneaded material, followed by kneading.

In the method for producing a rubber composition of the present invention, dispersibility of the silica from the viewpoint of a balance between rolling resistance and impact resilience in the rubber elastic body obtained from the rubber composition can be more improved by kneading the conjugated diene polymer (A) and the filler (C), and thereafter kneading the resulting kneaded material and the polymer (B). Accordingly, the resulting rubber elastic body becomes to have smaller rolling resistance and more excellent impact resilience.

Further, the method for producing a rubber composition of the present invention is not limited to the technique of kneading the conjugated diene polymer (A) and the filler (C), and thereafter kneading the resulting kneaded material and the polymer (B), and may also be, for example, a technique of kneading the optional ingredient as needed, together with the conjugated diene polymer (A), the polymer (B) and the filler (C) as the essential ingredients, at the same time.

Furthermore, the rubber elastic body obtained from the rubber composition according to the present invention is suitably used as a tire (specifically, a tread of a tire).

In such a tire having the tread obtained from the rubber composition according to the present invention, namely, in the tire of the present invention, rolling resistance is small, and excellent impact resilience is obtained.

Here, the tire of the present invention is produced by a usual method with using the rubber composition of the present invention.

Namely, for example, the rubber composition (unvulcanized rubber composition) of the present invention is extruded according to the shape of the tire to be molded (specifically, the shape of the tread) to perform molding on a tire molding machine by a usual method, thereby forming an uncross-linked (unvulcanized) tire. This uncross-linked (unvulcanized) tire is heated and pressurized in a vulcanizing machine to produce the tire composed of the rubber composition according to the present invention.

EXAMPLES

Although specific examples of the present invention will be described below, the present invention is not construed as being limited to these examples.

In the following examples and comparative examples, measuring methods of various physical property values are as follows:
(1) The contained ratio (hereinafter also referred to as the "bonded styrene content") of structural units derived from styrene as an aromatic vinyl compound in the conjugated diene polymer:

Calculated from the 500 MHz, $^1$H-NMR spectrum with using deuterated chloroform as a solvent.
(2) The content (hereinafter also referred to as the "vinyl bond content") of 1,2-vinyl bonds in a structural unit derived from a conjugated diene compound in the conjugated diene polymer:

Calculated from the 500 MHz, $^1$H-NMR spectrum.
(3) The glass transition temperature (Tg) in the conjugated diene polymer:

Measured by differential scanning calorimetry (DSC) in accordance with ASTM D3418.
(4) The molecular weight of the base polymer involved in the conjugated diene polymer:

Measurement was made by gel permeation chromatography (GPC), "HLC-8120GPC" (manufactured by Tosoh Corporation) under the following conditions, and the polystyrene-converted weight average molecular weight (Mw) was determined from the retention time corresponding to the maximum peak height of a GPC curve obtained.
(GPC Conditions)
Column: Trade name "GMHHXL" (manufactured by Tosoh Corporation), 2 columns
Column temperature: 40° C.
Mobile phase: Tetrahydrofuran Flow rate: 1.0 ml/min Sample concentration: 10 mg/20 ml (5) The Mooney viscosity in the conjugated diene polymer:

Measured in accordance with JIS K6300 with using an L-rotor under conditions of preheating for 1 minute, rotor operation for 4 minutes and a temperature of 100° C.

Synthesis Example 1 of Conjugated Diene Polymer; Synthesis of Conjugated Diene Polymer (A)

Firstly, in an autoclave reactor having an internal volume of 5 liters in which the atmosphere was replaced with nitrogen, 2,750 g of cyclohexane as a solvent, 50 g of tetrahydrofuran as an adjuster for adjusting the vinyl bond content, and 125 g of styrene and 375 g of 1,3-butadiene as monomers were charged. After adjusting the temperature in the reactor to 10° C., a cyclohexane solution containing 5.8 mmol of n-butyllithium as a polymerization initiator was added thereto to initiate polymerization. The polymerization was conducted under adiabatic conditions, and the maximum temperature reached 85° C.

After confirmation that the polymerization conversion reached 99%, the polymerization was further conducted for 5 minutes from the time when the polymerization conversion reached 99%. Thereafter, 10 g was sampled from a reaction solution obtained, namely a polymer solution containing a copolymer (base polymer) composed of a conjugated diene compound (1,3-butadiene) and an aromatic vinyl compound (styrene), for measurement of the molecular weight (for measurement of the molecular weight of the base polymer).

Then, a cyclohexane solution containing 4.96 mmol of N,N-bis(trimethylsilyl)aminopropylmethyldiethoxysilane was added as a functional group-introducing agent (compound for functional group introduction) to the polymer solution after sampling, followed by reaction for 15 minutes. Thereafter, 2 g of 2,6-di-tert-butyl-p-cresol was added to a polymer solution obtained, and further, a desolvation treatment was performed by steam stripping with using hot water adjusted to pH 9 with sodium hydroxide. Then, a drying treatment was performed with a hot roll controlled to 110° C. to obtain a conjugated diene polymer (hereinafter also referred to as "conjugated diene polymer (A1)") having a hydrocarbyloxysilyl group and a primary amino group as specific functional groups at one molecular end.

For the resulting conjugated diene polymer (A1), the bonded styrene content, vinyl bond content, glass transition temperature and Mooney viscosity were measured. The results thereof are shown in Table 2, together with the weight average molecular weight of the polymer before the specific functional group introduction, namely the weight average molecular weight of the base polymer.

Synthesis Example 2 of Conjugated Diene Polymer; Synthesis of Conjugated Diene Polymer (A)

A conjugated diene polymer (hereinafter also referred to as "conjugated diene polymer (A2)") having a hydrocarbyloxysilyl group and a tertiary amino group as specific functional groups at one molecular end was obtained by the same technique as in Synthesis Example 1 of conjugated diene polymer with the exception that 4.96 mmol of 1-[3-(triethoxysilyl)-propyl]-4-methylpiperazine was used as a compound for functional group introduction in place of 4.96 mmol of N,N-bis-(trimethylsilyl)aminopropylmethyldiethoxysilane.

For the resulting conjugated diene polymer (A2), the bonded styrene content, vinyl bond content, glass transition temperature and Mooney viscosity were measured. The results thereof are shown in Table 2, together with the weight average molecular weight of the polymer before the specific functional group introduction, namely the weight average molecular weight of the base polymer.

Synthesis Example 3 of Conjugated Diene Polymer; Synthesis of Conjugated Diene Polymer (A)

A conjugated diene polymer (hereinafter also referred to as "conjugated diene polymer (A3)") having a hydrocarbyloxysilyl group and a secondary amino group as specific functional groups at one molecular end was obtained by the same technique as in Synthesis Example 1 of Conjugated diene polymer with the exception that 4.96 mmol of 3-(4-trimethylsilyl-1-piperazino)propyltriethoxysilane was used as a compound for functional group introduction in place of 4.96 mmol of N,N-bis-(trimethylsilyl)aminopropylmethyldiethoxysilane.

For the resulting conjugated diene polymer (A3), the bonded styrene content, vinyl bond content, glass transition temperature and Mooney viscosity were measured. The results thereof are shown in Table 2, together with the weight average molecular weight of the polymer before the specific functional group introduction, namely the weight average molecular weight of the base polymer.

Synthesis Example 4 of Conjugated Diene Polymer; Synthesis of Conjugated Diene Polymer (A)

A conjugated diene polymer (hereinafter also referred to as "conjugated diene polymer (A4)") having a hydrocarbyloxysilyl group, a primary amino group and a secondary amino group as specific functional groups at one molecular end was obtained by the same technique as in Synthesis Example 1 of conjugated diene polymer with the exception that 4.96 mmol of N,N',N'-tris(trimethylsilyl)-N-(2-amino-ethyl)-3-aminopropyltriethoxysilane was used as a compound for functional group introduction in place of 4.96 mmol of N,N-bis(trimethylsilyl)aminopropyl-methyldiethoxysilane.

For the resulting conjugated diene polymer (A4), the bonded styrene content, vinyl bond content, glass transition temperature and Mooney viscosity were measured. The results thereof are shown in Table 2, together with the weight average molecular weight of the polymer before the specific functional group introduction, namely the weight average molecular weight of the base polymer.

Synthesis Example 5 of Conjugated Diene Polymer; Synthesis of Conjugated Diene Polymer (A)

A conjugated diene polymer (hereinafter also referred to as "conjugated diene polymer (A5)") having a hydrocarbyloxysilyl group and a tertiary amino group as specific functional groups at one molecular end was obtained by the same technique as in Synthesis Example 1 of conjugated diene polymer with the exception that 4.96 mmol of [3-(dimethylamino)propyl]triethoxysilane was used as a compound for functional group introduction in place of 4.96 mmol of N,N-bis(trimethylsilyl)aminopropylmethyldiethoxysilane.

For the resulting conjugated diene polymer (A5), the bonded styrene content, vinyl bond content, glass transition temperature and Mooney viscosity were measured. The results thereof are shown in Table 2, together with the weight average molecular weight of the polymer before the specific functional group introduction, namely the weight average molecular weight of the base polymer.

Synthesis Example 6 of Conjugated Diene Polymer; Synthesis of Conjugated Diene Polymer (A)

A conjugated diene polymer (hereinafter also referred to as "conjugated diene polymer (A6)") having a hydrocarbyloxysilyl group and a thiol group as specific functional groups at one molecular end was obtained by the same technique as in Synthesis Example 1 of conjugated diene polymer with the exception that 4.96 mmol of S-trimethylsilylmercaptopropylmethyldiethoxysilane was used as a compound for functional group introduction in place of 4.96 mmol of N,N-bis(trimethylsilyl)aminopropylmethyldiethoxysilane.

For the resulting conjugated diene polymer (A6), the bonded styrene content, vinyl bond content, glass transition temperature and Mooney viscosity were measured. The results thereof are shown in Table 2, together with the weight average molecular weight of the polymer before the specific functional group introduction, namely the weight average molecular weight of the base polymer.

Synthesis Example 7 of Conjugated Diene Polymer; Synthesis of Conjugated Diene Polymer (A)

A mixture (hereinafter also referred to as "conjugated diene polymer (A7)") of a conjugated diene polymer having a hydrocarbyloxysilyl group and a primary amino group at one molecular end and a conjugated diene polymer having a hydrocarbyloxysilyl group and a secondary amino group at one molecular end was obtained by the same technique as in Synthesis Example 1 of conjugated diene polymer with the exception that 4.96 mmol of N-(1,3-dimethylbutylidene)-3-(tri-ethoxysilyl)-1-propaneamine was used as a compound for functional group introduction in place of 4.96 mmol of N,N-bis(trimethylsilyl)aminopropyl-methyldiethoxysilane.

For the resulting conjugated diene polymer (A7), the bonded styrene content, vinyl bond content, glass transition temperature and Mooney viscosity were measured. The results thereof are shown in Table 2, together with the weight average molecular weight of the polymer before the specific functional group introduction, namely the weight average molecular weight of the base polymer.

Synthesis Example 8 of Conjugated diene polymer; Synthesis of Conjugated diene polymer (A)

A conjugated diene polymer (hereinafter also referred to as "conjugated dienepolymer (A8)") having a hydrocarbyloxysilyl group and a primary amino group as specific functional groups at one molecular end was obtained by the same technique as in Synthesis Example 1 of conjugated diene polymer with the exception that 4.96 mmol of tetraethoxysilane and 4.96 mmol of N-(3-triethoxysilylpropyl)-4,5-dihydro-imidazole were used as compounds for functional group introduction in place of 4.96 mmol of N,N-bis(trimethylsilyl)aminopropylmethyldiethoxysilane and that these tetra-ethoxysilane and N-(3-triethoxysilylpropyl)-4,5-dihydroimidazole were added in this order.

For the resulting conjugated diene polymer (A8), the bonded styrene content, vinyl bond content, glass transition temperature and Mooney viscosity were measured. The results thereof are shown in Table 2, together with the weight average molecular weight of the polymer before the specific functional group introduction, namely the weight average molecular weight of the base polymer.

Synthesis Example 9 of Conjugated Diene Polymer; Synthesis of Conjugated Diene Polymer (A)

A conjugated diene polymer (hereinafter also referred to as "conjugated diene polymer (A9)") having a hydrocarbyloxysilyl group and a primary amino group as specific functional groups at one molecular end and comprising an onium salt structure formed therein was obtained by the same technique as in Synthesis Example 1 of Conjugated diene polymer with the exception that a cyclohexane solution containing 2.69 mmol of silicon tetrachloride was added before addition of 2,6-di-tert-butyl-p-cresol, followed by mixing for 5 minutes.

For the resulting conjugated diene polymer (A9), the bonded styrene content, vinyl bond content, glass transition temperature and Mooney viscosity were measured. The results thereof are shown in Table 2, together with the weight average molecular weight of the polymer before the specific functional group introduction, namely the weight average molecular weight of the base polymer.

TABLE 1

| | Conjugated Diene Polymer (A) Number | A1 | A2 | A3 | A4 | A5 | A6 | A7 | A8 | A9 |
|---|---|---|---|---|---|---|---|---|---|---|
| Solvent (g) | Cyclohexane | 2750 | 2750 | 2750 | 2750 | 2750 | 2750 | 2750 | 2750 | 2750 |
| Vinyl Bond Content Adjuster (g) | Tetrahydrofuran | 50 | 50 | 50 | 50 | 50 | 50 | 50 | 50 | 50 |
| Monomer (g) | Styrene | 125 | 125 | 125 | 125 | 125 | 125 | 125 | 125 | 125 |
| | 1,3-Butadiene | 375 | 375 | 375 | 375 | 375 | 375 | 375 | 375 | 375 |
| Polymerization Initiator (mmol) | n-Butyllithium | 5.8 | 5.8 | 5.8 | 5.8 | 5.8 | 5.8 | 5.8 | 5.8 | 5.8 |
| Functional Group-Introducing Agent (mmol) | Hydrocarbyloxysilane Compound (1) | 4.96 | — | — | — | — | — | — | — | 4.96 |
| | Hydrocarbyloxysilane Compound (2) | — | 4.96 | — | — | — | — | — | — | — |
| | Hydrocarbyloxysilane Compound (3) | — | — | 4.96 | — | — | — | — | — | — |
| | Hydrocarbyloxysilane Compound (4) | — | — | — | 4.96 | — | — | — | — | — |
| | Hydrocarbyloxysilane Compound (5) | — | — | — | — | 4.96 | — | — | — | — |
| | Hydrocarbyloxysilane Compound (6) | — | — | — | — | — | 4.96 | — | — | — |
| | Hydrocarbyloxysilane Compound (7) | — | — | — | — | — | — | 4.96 | — | — |
| | Hydrocarbyloxysilane Compound (8) | — | — | — | — | — | — | — | 4.96 | — |
| | Hydrocarbyloxysilane Compound (9) | — | — | — | — | — | — | — | 4.96 | — |
| Onium-Forming Agent (mmol) | Silicon Tetrachloride | — | — | — | — | — | — | — | — | 2.69 |

In Table 1, the "hydrocarbyloxysilane compound (1)" is N,N-bis(trimethyl-silyl)aminopropylmethyldiethoxysilane, the "hydrocarbyloxysilane compound (2)" is 1-[3-(triethoxysilyl)-propyl]-4-methylpiperazine; the "hydrocarbyloxysilane compound (3)" is 3-(4-trimethylsilyl-1-piperazino)propyltriethoxysilane; the "hydrocarbyloxysilane compound (4)" is N,N',N'-tris(trimethylsilyl)-N-(2-amino-ethyl)-3-aminopropyltriethoxysilane; the "hydrocarbyloxysilane compound (5)" is [3-(dimethylamino)propyl]triethoxysilane; the "hydrocarbyloxysilane compound (6)" is S-trimethylsilylmercaptopropylmethyldiethoxysilane; the "hydrocarbyloxysilane compound (7)" is N-(1,3-dimethylbutylidene)-3-(triethoxysilyl)-1-propaneamine; the "hydrocarbyloxysilane compound (8)" is tetraethoxysilane; and the "hydrocarbyloxysilane compound (9)" is N-(3-triethoxysilylpropyl)-4,5-dihydroimidazole.

TABLE 2

| Conjugated diene polymer (A) Number | A1 | A2 | A3 | A4 | A5 | A6 | A7 | A8 | A9 |
|---|---|---|---|---|---|---|---|---|---|
| Bonded Styrene Content (% by mass) | 25 | 25 | 25 | 25 | 25 | 25 | 25 | 25 | 25 |
| Vinyl Bond Content (mol %) | 56 | 55 | 55 | 54 | 56 | 55 | 54 | 54 | 56 |
| Glass Transition Temperature (° C.) | −30 | −30 | −31 | −30 | −30 | −30 | −30 | −30 | −30 |
| Molecular Weight of Base Polymer Mw (×$10^4$) | 21 | 20 | 19 | 20 | 19 | 20 | 20 | 20 | 21 |
| Mooney Viscosity (ML1 + 4, 100° C.) | 8 | 23 | 28 | 24 | 22 | 8 | 28 | 27 | 65 |

Synthesis Example 10 of Conjugated Diene Polymer; Synthesis of Conjugated Diene Polymer (B)

Firstly, in an autoclave reactor having an internal volume of 5 liters in which the atmosphere was replaced with nitrogen, 2,750 g of cyclohexane as a solvent, 50 g of tetrahydrofuran as an adjuster for adjusting the vinyl bond content, and 125 g of styrene and 375 g of 1,3-butadiene as monomers were charged. After adjusting the temperature in the reactor to 10° C., 2.9 mmol of a bifunctional anion living polymerization initiator obtained by reacting diisopropenylbenzene and butyllithium in the presence of trioctylamine was added thereto as a polymerization initiator (dilithium multifunctional initiator) to initiate polymerization. The polymerization was conducted under adiabatic conditions, and the maximum temperature reached 85° C.

After confirmation that the polymerization conversion reached 99%, the polymerization was further conducted for 5 minutes from the time when the polymerization conversion reached 99%. Thereafter, 10 g was sampled from a reaction solution obtained, namely a polymer solution containing a copolymer (base polymer) composed of a conjugated diene compound (1,3-butadiene) and an aromatic vinyl compound (styrene), for measurement of the molecular weight (for measurement of the molecular weight of the base polymer).

Then, a cyclohexane solution containing 4.96 mmol of N,N-bis(trimethylsilyl)aminopropylmethyldiethoxysilane was added as a functional group-introducing agent (compound for functional group introduction) to the polymer solution after sampling, followed by reaction for 15 minutes. Thereafter, 2 g of 2,6-di-tert-butyl-p-cresol was added to a polymer solution obtained, and further, a desolvation treatment was performed by steam stripping with using hot water adjusted to pH 9 with sodium hydroxide. Then, a drying treatment was performed with a hot roll controlled to 110° C. to obtain a conjugated diene polymer (hereinafter also referred to as "conjugated diene polymer (B1)") having a hydrocarbyloxysilyl group and a primary amino group as specific functional groups at each of molecular ends.

For the resulting conjugated diene polymer (B1), the bonded styrene content, vinyl bond content, glass transition temperature and Mooney viscosity were measured. The results thereof are shown in Table 4, together with the weight average molecular weight of the polymer before the specific functional group introduction, namely the weight average molecular weight of the base polymer.

TABLE 3

| Conjugated Diene Polymer (B) Number | | B1 |
|---|---|---|
| Solvent (g) | Cyclohexane | 2750 |
| Vinyl Bond Content Adjuster (g) | Tetrahydrofuran | 50 |
| Monomer (g) | Styrene | 125 |
| | 1,3-Butadiene | 375 |
| Polymerization Initiator (mmol) | Dilithium-Based Multifunctional Initiator | 2.9 |
| Functional Group-Introducing Agent (mmol) | Hydrocarbyloxysilane Compound (1) | 4.96 |

In Table 3, the "dilithium multifunctional initiator" indicates a bifunctional anion living polymerization initiator obtained by reacting diisopropenylbenzene and butyllithium in the presence of trioctylamine. Further, in the same table, the "hydrocarbyloxysilane compound (1)" indicates N,N-bis(trimethylsilyl)aminopropylmethyldiethoxysilane.

TABLE 4

| Conjugated diene polymer (B) Number | B1 |
|---|---|
| Bonded Styrene Content (% by mass) | 25 |
| Vinyl Bond Content (mol %) | 56 |
| Glass Transition Temperature (° C.) | −30 |
| Molecular Weight of Base Polymer Mw (×$10^4$) | 19 |

Example 1

With using a plastomill (internal volume: 250 cc) equipped with a temperature controller, 80 parts by mass of conjugated diene polymer (A1), 20 parts by mass of butadiene rubber, "BR01" (manufactured by JSR Corporation), 45 parts by mass of an extender oil, "SNH46" (manufactured by Sankyo Yuka Kogyo K.K.), 6.7 parts by mass of carbon black, 84 parts by mass of silica, "Nipsil AQ" (manufactured by Tosoh Silica Corporation, primary average particle size: 15 nm), 10 parts by mass of a silane coupling agent, "Si-69" (manufactured by Degussa AG), 2.4 parts by mass of stearic acid, 1.2 parts by mass of an antioxidant, "Nocrac 810NA" (manufactured by Ouchi Shinko Chemical Industrial Co., Ltd.) and 3.6 parts by mass of zinc oxide (zinc white) were kneaded under kneading conditions of a filling rate of 72%, a rotation number of 60 rpm and a temperature of 120° C. Thereafter, 20 parts by mass of conjugated diene polymer (B1) was kneaded at the time when the torque exceeded a peak (first-step kneading). Then, a kneaded material obtained by the first-step kneading was cooled to room temperature, and thereafter, 1.8 parts by mass of a vulcanization accelerator, "Nocceler CZ" (manufactured by Ouchi Shinko Chemical Industrial Co., Ltd.), 1.8 parts by mass of a vulcanization accelerator, "Nocceler D" (manufactured by Ouchi Shinko Chemical Industrial Co., Ltd.) and 1.8 parts by mass of sulfur were further added thereto, and kneaded under conditions of a rotation number of 60 rpm and a temperature of 80° C. (second-step kneading) to obtain a rubber composition (hereinafter also referred to as "rubber composition (1)").

The resulting rubber composition (1) was molded, and vulcanized with a vulcanizing press under a temperature condition of 160° C. for a predetermined period of time to obtain a rubber elastic body (hereinafter also referred to as "rubber elastic body (1)").

For the resulting rubber elastic body (1), the following characteristic evaluations were performed. The results thereof are shown in Table 5.

Here, in rubber composition (1), the contained ratio of the silica is 70 parts by mass based on 100 parts by mass of the rubber component.

(1) Impact Resilience:

With using a tripso type impact resilience test (manufactured by Toyo Seiki Seisaku-sho, Ltd.), measurement was carried out under conditions of 50° C.

The index at the time when the value of the rubber elastic body according to Comparative Example 1 is taken as 100 is shown in Table 5. According to the index, the larger value shows the larger and better impact resilience.

(2) Wet Skid Resistance (0° C. tan δ):

With using a dynamic spectrometer (manufactured by US Rheometric Inc.), measurement was carried out under conditions of a tensile dynamic distortion of 0.14%, an angular velocity of 100 radians per second and a temperature of 0° C.

The index at the time when the value of the rubber elastic body according to Comparative Example 1 is taken as 100 is shown in Table 5. According to the index, the larger value shows the larger and better wet skid resistance.

(3) Low Hysteresis Loss Property (70° C. tan δ):

With using a dynamic spectrometer (manufactured by US Rheometric Inc.), measurement was carried out under conditions of a tensile dynamic distortion of 0.7%, an angular velocity of 100 radians per second and a temperature of 70° C.

The index at the time when the value of the rubber elastic body according to Comparative Example 1 is taken as 100 is shown in Table 5. According to the index, the larger value shows the larger and better low hysteresis loss property.

Example 2

A rubber composition (hereinafter also referred to as "rubber composition (2)") was obtained by the same technique as in Example 1 with the exception that conjugated diene polymer (A2) was used in place of conjugated diene polymer (A1), and a rubber elastic body (hereinafter also referred to as "rubber elastic body (2)") was obtained from the rubber composition (2).

For the resulting rubber elastic body (2), the characteristic evaluations were performed in the same manner as in Example 1. The results thereof are shown in Table 5.

Here, in rubber composition (2), the contained ratio of the silica is 70 parts by mass based on 100 parts by mass of the rubber component.

Example 3

A rubber composition (hereinafter also referred to as "rubber composition (3)") was obtained by the same technique as in Example 1 with the exception that conjugated diene polymer (A3) was used in place of conjugated diene polymer (A1), and a rubber elastic body (hereinafter also referred to as "rubber elastic body (3)") was obtained from the rubber composition (3).

For the resulting rubber elastic body (3), the characteristic evaluations were performed in the same manner as in Example 1. The results thereof are shown in Table 5.

Here, in rubber composition (3), the contained ratio of the silica is 70 parts by mass based on 100 parts by mass of the rubber component.

Example 4

A rubber composition (hereinafter also referred to as "rubber composition (4)") was obtained by the same technique as in Example 1 with the exception that conjugated diene polymer (A4) was used in place of conjugated diene polymer (A1), and a rubber elastic body (hereinafter also referred to as "rubber elastic body (4)") was obtained from the rubber composition (4).

For the resulting rubber elastic body (4), the characteristic evaluations were performed in the same manner as in Example 1. The results thereof are shown in Table 5.

Here, in rubber composition (4), the contained ratio of the silica is 70 parts by mass based on 100 parts by mass of the rubber component.

Example 5

A rubber composition (hereinafter also referred to as "rubber composition (5)") was obtained by the same technique as in Example 1 with the exception that conjugated diene polymer (A5) was used in place of conjugated diene polymer (A1), and a rubber elastic body (hereinafter also referred to as "rubber elastic body (5)") was obtained from the rubber composition (5).

For the resulting rubber elastic body (5), the characteristic evaluations were performed in the same manner as in Example 1. The results thereof are shown in Table 5.

Here, in rubber composition (5), the contained ratio of the silica is 70 parts by mass based on 100 parts by mass of the rubber component.

Example 6

A rubber composition (hereinafter also referred to as "rubber composition (6)") was obtained by the same technique as in Example 1 with the exception that conjugated diene polymer (A6) was used in place of conjugated diene polymer (A1), and a rubber elastic body (hereinafter also referred to as "rubber elastic body (6)") was obtained from the rubber composition (6).

For the resulting rubber elastic body (6), the characteristic evaluations were performed in the same manner as in Example 1. The results thereof are shown in Table 5.

Here, in rubber composition (6), the contained ratio of the silica is 70 parts by mass based on 100 parts by mass of the rubber component.

Example 7

A rubber composition (hereinafter also referred to as "rubber composition (7)") was obtained by the same technique as in Example 1 with the exception that conjugated diene polymer (A7) was used in place of conjugated diene polymer (A1), and a rubber elastic body (hereinafter also referred to as "rubber elastic body (7)") was obtained from the rubber composition (7).

For the resulting rubber elastic body (7), the characteristic evaluations were performed in the same manner as in Example 1. The results thereof are shown in Table 5.

Here, in rubber composition (7), the contained ratio of the silica is 70 parts by mass based on 100 parts by mass of the rubber component.

Example 8

A rubber composition (hereinafter also referred to as "rubber composition (8)") was obtained by the same technique as in Example 1 with the exception that conjugated diene polymer (A8) was used in place of conjugated diene polymer (A1), and a rubber elastic body (hereinafter also referred to as "rubber elastic body (8)") was obtained from the rubber composition (8).

For the resulting rubber elastic body (8), the characteristic evaluations were performed in the same manner as in Example 1. The results thereof are shown in Table 5.

Here, in rubber composition (8), the contained ratio of the silica is 70 parts by mass based on 100 parts by mass of the rubber component.

Example 9

A rubber composition (hereinafter also referred to as "rubber composition (9)") was obtained by the same technique as in Example 1 with the exception that conjugated diene polymer (A9) was used in place of conjugated diene polymer (A1), and a rubber elastic body (hereinafter also referred to as "rubber elastic body (9)") was obtained from the rubber composition (9).

For the resulting rubber elastic body (9), the characteristic evaluations were performed in the same manner as in Example 1. The results thereof are shown in Table 5.

Here, in rubber composition (9), the contained ratio of the silica is 70 parts by mass based on 100 parts by mass of the rubber component.

Example 10

With using a plastomill (internal volume: 250 cc) equipped with a temperature controller, 80 parts by mass of functional group-introduced conjugated diene polymer (A1), 20 parts by mass of butadiene rubber, "BR01" (manufactured by JSR Corporation), 20 parts by mass of conjugated diene polymer (B1), 45 parts by mass of an extender oil, "SNH46" (manufactured by Sankyo Yuka Kogyo K.K.), 6.7 parts by mass of carbon black, 84 parts by mass of silica, "Nipsil AQ" (manufactured by Tosoh Silica Corporation, primary average particle size: 15 nm), 10 parts by mass of a silane coupling agent, "Si-69" (manufactured by Degussa AG), 2.4 parts by mass of stearic acid, 1.2 parts by mass of an antioxidant, "Nocrac 810NA" (manufactured by Ouchi Shinko Chemical Industrial Co., Ltd.) and 3.6 parts by mass of zinc oxide (zinc white) were kneaded under kneading conditions of a filling rate of 72%, a rotation number of 60 rpm and a temperature of 120° C. (first-step kneading). Then, a kneaded material obtained by the first-step kneading was cooled to room temperature, and thereafter, 1.8 parts by mass of a vulcanization accelerator, "Nocceler CZ" (manufactured by Ouchi Shinko Chemical Industrial Co., Ltd.), 1.8 parts by mass of a vulcanization accelerator, "Nocceler D" (manufactured by Ouchi Shinko Chemical Industrial Co., Ltd.) and 1.8 parts by mass of sulfur were further added thereto, and kneaded under conditions of a rotation number of 60 rpm and a temperature of 80° C. (second-step kneading) to obtain a rubber composition (hereinafter also referred to as "rubber composition (10)").

The resulting rubber composition (10) was molded, and vulcanized with a vulcanizing press under a temperature condition of 160° C. for a predetermined period of time to obtain a rubber elastic body (hereinafter also referred to as "rubber elastic body (10)").

For the resulting rubber elastic body (10), the following characteristic evaluations were performed. The results thereof are shown in Table 5.

Here, in rubber composition (10), the contained ratio of the silica is 70 parts by mass based on 100 parts by mass of the rubber component.

Example 11

A rubber composition (hereinafter also referred to as "rubber composition (11)") was obtained by the same technique as in Example 1 with the exception that conjugated diene polymer (A1) was blended in an amount of 97 parts by mass and that conjugated diene polymer (B1) was blended in an amount of 3 parts by mass, and a rubber elastic body (hereinafter also referred to as "rubber elastic body (11)") was obtained from the rubber composition (11).

For the resulting rubber elastic body (11), the characteristic evaluations were performed in the same manner as in Example 1. The results thereof are shown in Table 5.

Here, in rubber composition (11), the contained ratio of the silica is 70 parts by mass based on 100 parts by mass of the rubber component.

Example 12

A rubber composition (hereinafter also referred to as "rubber composition (12)") was obtained by the same technique as in Example 1 with the exception that conjugated diene polymer (A1) was blended in an amount of 65 parts by mass and that conjugated diene polymer (B1) was blended in an amount of 35 parts by mass, and a rubber elastic body (hereinafter also referred to as "rubber elastic body (12)") was obtained from the rubber composition (12).

For the resulting rubber elastic body (12), the characteristic evaluations were performed in the same manner as in Example 1. The results thereof are shown in Table 5.

Here, in rubber composition (12), the contained ratio of the silica is 70 parts by mass based on 100 parts by mass of the rubber component.

Comparative Example 1

A rubber composition (hereinafter also referred to as "comparative rubber composition (1)") was obtained by the same technique as in Example 1 with the exception that conjugated diene polymer (A1) was blended in an amount of 100 parts by mass and that conjugated diene polymer (B1) was not used, and a rubber elastic body (hereinafter also referred to as "comparative rubber elastic body (1)") was obtained from the comparative rubber composition (1).

For the resulting comparative rubber elastic body (1), the characteristic evaluations were performed in the same manner as in Example 1. The results thereof are shown in Table 5.

TABLE 5

| | | | | Examples | | | | | | | | | | | | | Comparative Example |
|---|---|---|---|---|---|---|---|---|---|---|---|---|---|---|---|---|---|
| | | | | 1 | 2 | 3 | 4 | 5 | 6 | 7 | 8 | 9 | 10 | 11 | 12 | 1 |
| Rubber Composition | Rubber Component | Conjugated diene polymer (A) | Kind | A1 | A2 | A3 | A4 | A5 | A6 | A7 | A8 | A9 | A1 | A1 | A1 | A1 |
| | | | Contained Ratio (parts by mass) | 80 | 80 | 80 | 80 | 80 | 80 | 80 | 80 | 80 | 80 | 97 | 65 | 100 |
| | | Conjugated diene polymer (B) | Kind | B1 | B1 | B1 | B1 | B1 | B1 | B1 | B1 | B1 | B1 | B1 | B1 | — |
| | | | Contained Ratio (parts by mass) | 20 | 20 | 20 | 20 | 20 | 20 | 20 | 20 | 20 | 20 | 3 | 35 | — |
| | | Mass Ratio (A/B) | | 80/20 | 80/20 | 80/20 | 80/20 | 80/20 | 80/20 | 80/20 | 80/20 | 80/20 | 80/20 | 80/20 | 80/20 | 100/0 |
| | Production Method | | | a | a | a | a | a | a | a | a | a | b | a | a | a |
| Evaluation | Impact Resilience | | | 125 | 121 | 118 | 120 | 123 | 120 | 118 | 117 | 120 | 110 | 115 | 115 | 100 |
| | Wet Skid Resistance (0° C. tan δ) | | | 117 | 112 | 112 | 113 | 114 | 112 | 113 | 114 | 114 | 105 | 110 | 108 | 100 |
| | Low Hysteresis Loss Property (70° C. tan δ) | | | 118 | 112 | 115 | 113 | 113 | 112 | 113 | 112 | 114 | 106 | 105 | 109 | 100 |

In Table 5, "a" in the "production method" indicates a technique of producing the rubber composition by kneading the conjugated diene polymer (A) and the filler (C), and thereafter, kneading the resulting kneaded material and the polymer (B). Further, "b" indicates a technique of producing the rubber composition by kneading the conjugated diene polymer (A), the polymer (B) and the filler (C) at the same time.

The invention claimed is:

1. A method for producing a rubber composition the method comprising kneading:
   a conjugated diene polymer (A) having a group with bonding reactivity to silica only at one site of one molecule of the polymer,
   a polymer (B) having groups with bonding reactivity to silica at a plurality of sites of one molecule of the polymer, and
   a filler (C) comprising silica.

2. The method of claim 1, comprising first kneading the conjugated diene polymer (A) and the filler (C) to obtain a kneaded mixture, then kneading the kneaded mixture and the polymer (B).

3. The method of claim 1, wherein a mass ratio of the conjugated diene polymer (A) to the polymer (B) is in a range from 97/3 to 60/40.

4. The method of claim 1, wherein the polymer (B) comprises a structural unit derived from a conjugated diene compound.

5. The method of claim 1, wherein:
   the group with bonding reactivity to silica at one site of one molecule of the conjugated diene polymer (A) is at least one functional group selected from the group consisting of a hydrocarbyloxysilyl group, a primary amino group, a secondary amino group, a tertiary amino group, a thiol group, an epoxy group, a thioepoxy group, an oxetane group and a hydrocarbylthio group, and
   the groups with bonding reactivity to silica at a plurality of sites of one molecule of the polymer (B) are each independently at least one functional group selected from the group consisting of a hydrocarbyloxysilyl group, a primary amino group, a secondary amino group, a tertiary amino group, a thiol group, an epoxy group, a thioepoxy group, an oxetane group and a hydrocarbylthio group.

6. The method of claim 1, wherein an amount of silica in the filler (C) is from 10 to 120 parts by mass based on 100 parts by mass of a rubber component comprising the conjugated diene polymer (A) and the polymer (B).

7. A rubber composition obtained by kneading:
   a conjugated diene polymer (A) having a group with bonding reactivity to silica only at one site of one molecule of the polymer,
   a polymer (B) having groups with bonding reactivity to silica at a plurality of sites of one molecule of the polymer, and
   a filler (C) comprising silica.

8. The rubber composition of claim 7, obtained by first kneading the conjugated diene polymer (A) and the filler (C) to obtain a kneaded mixture, then kneading the kneaded mixture and the polymer (B).

9. The rubber composition of claim 7, wherein a mass ratio of the conjugated diene polymer (A) to the polymer (B) is in a range from 97/3 to 60/40.

10. The rubber composition of claim 7, wherein the polymer (B) comprises a structural unit derived from a conjugated diene compound.

11. The rubber composition of claim 7, wherein:
    the group with bonding reactivity to silica at one site of one molecule of the conjugated diene polymer (A) is at least one functional group selected from the group consisting of a hydrocarbyloxysilyl group, a primary amino group, a secondary amino group, a tertiary amino group, a thiol group, an epoxy group, a thioepoxy group, an oxetane group and a hydrocarbylthio group, and
    the groups with bonding reactivity to silica at a plurality of sites of one molecule of the polymer (B) are each independently at least one functional group selected from the group consisting of a hydrocarbyloxysilyl group, a primary amino group, a secondary amino group, a tertiary amino group, a thiol group, an epoxy group, a thioepoxy group, an oxetane group and a hydrocarbylthio group.

12. The rubber composition of claim 7, wherein an amount of silica in the filler (C) is from 10 to 120 parts by mass based on 100 parts by mass of a rubber component comprising the conjugated diene polymer (A) and the polymer (B).

13. A rubber composition comprising:
    a rubber component comprising a conjugated diene polymer (A) having a group with bonding reactivity to silica only at one site of one molecule of the polymer and a polymer (B) having groups with bonding reactivity to silica at a plurality of sites of one molecule of the polymer, and
    a filler (C) comprising silica.

14. A tire having a tread obtained from the rubber composition of claim 7.

15. The method of claim 2, wherein a mass ratio of the conjugated diene polymer (A) to the polymer (B) is in a range from 97/3 to 60/40.

16. The method of claim 2, wherein the polymer (B) comprises a structural unit derived from a conjugated diene compound.

17. The method of claim 3, wherein the polymer (B) comprises a structural unit derived from a conjugated diene compound.

18. The method of claim 15, wherein the polymer (B) comprises a structural unit derived from a conjugated diene compound.

19. The method of claim 2, wherein:
the group with bonding reactivity to silica at one site of one molecule of the conjugated diene polymer (A) is at least one functional group selected from the group consisting of a hydrocarbyloxysilyl group, a primary amino group, a secondary amino group, a tertiary amino group, a thiol group, an epoxy group, a thioepoxy group, an oxetane group and a hydrocarbylthio group, and
the groups with bonding reactivity to silica at a plurality of sites of one molecule of the polymer (B) are each independently at least one functional group selected from the group consisting of a hydrocarbyloxysilyl group, a primary amino group, a secondary amino group, a tertiary amino group, a thiol group, an epoxy group, a thioepoxy group, an oxetane group and a hydrocarbylthio group.

20. The method of claim 3, wherein:
the group with bonding reactivity to silica at one site of one molecule of the conjugated diene polymer (A) is at least one functional group selected from the group consisting of a hydrocarbyloxysilyl group, a primary amino group, a secondary amino group, a tertiary amino group, a thiol group, an epoxy group, a thioepoxy group, an oxetane group and a hydrocarbylthio group, and
the groups with bonding reactivity to silica at a plurality of sites of one molecule of the polymer (B) are each independently at least one functional group selected from the group consisting of a hydrocarbyloxysilyl group, a primary amino group, a secondary amino group, a tertiary amino group, a thiol group, an epoxy group, a thioepoxy group, an oxetane group and a hydrocarbylthio group.

* * * * *